(12) United States Patent
Pham et al.

(10) Patent No.: US 8,661,487 B2
(45) Date of Patent: Feb. 25, 2014

(54) ACCESSING REMOTE VIDEO DEVICES

(75) Inventors: Hung John Pham, Cedar Park, TX (US); Bach N. Hoang, Cedar Park, TN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 666 days.

(21) Appl. No.: 12/577,612

(22) Filed: Oct. 12, 2009

(65) Prior Publication Data

US 2011/0088070 A1    Apr. 14, 2011

(51) Int. Cl.
*H04N 7/173* (2011.01)

(52) U.S. Cl.
USPC .......................................................... 725/107

(58) Field of Classification Search
USPC ............. 725/9, 14–20, 93–96, 107, 109, 110, 725/104; 348/192–193, 731–732, 726, 709, 348/748
See application file for complete search history.

(56) References Cited

U.S. PATENT DOCUMENTS

| | | | | |
|---|---|---|---|---|
| 5,586,264 | A * | 12/1996 | Belknap et al. | 725/115 |
| 6,397,388 | B1 | 5/2002 | Allen | |
| 6,501,516 | B1 * | 12/2002 | Clapper | 348/734 |
| 6,678,004 | B1 | 1/2004 | Schultheiss et al. | |
| 7,429,932 | B1 * | 9/2008 | Newell et al. | 340/12.24 |
| 7,661,075 | B2 | 2/2010 | Lahdesmaki | |
| 7,671,735 | B2 | 3/2010 | Karaoguz et al. | |
| 7,685,523 | B2 | 3/2010 | Calderone et al. | |
| 7,770,198 | B1 * | 8/2010 | Greene | 725/93 |
| 7,793,317 | B2 | 9/2010 | Sullivan et al. | |
| 7,826,383 | B2 | 11/2010 | Savard et al. | |
| 7,873,029 | B2 | 1/2011 | Chang et al. | |
| 2002/0184645 | A1 * | 12/2002 | Austin et al. | 725/107 |
| 2003/0066075 | A1 | 4/2003 | Bahn et al. | |
| 2004/0163130 | A1 | 8/2004 | Gray et al. | |
| 2004/0244056 | A1 * | 12/2004 | Lorenz et al. | 725/135 |
| 2005/0063333 | A1 | 3/2005 | Patron et al. | |
| 2006/0174279 | A1 | 8/2006 | Sullivan et al. | |
| 2006/0179468 | A1 | 8/2006 | Pearson | |
| 2007/0097860 | A1 | 5/2007 | Rys et al. | |
| 2007/0143790 | A1 | 6/2007 | Williams et al. | |
| 2007/0206753 | A1 | 9/2007 | Chang et al. | |
| 2008/0040767 | A1 | 2/2008 | McCarthy et al. | |
| 2008/0201616 | A1 * | 8/2008 | Ashmore | 714/57 |
| 2009/0282444 | A1 * | 11/2009 | Laksono et al. | 725/89 |
| 2010/0299696 | A1 * | 11/2010 | Konishi | 725/25 |
| 2011/0075657 | A1 | 3/2011 | Chang et al. | |

FOREIGN PATENT DOCUMENTS

WO    WO 2009/093538    *    7/2009

* cited by examiner

*Primary Examiner* — Brian Pendleton
*Assistant Examiner* — Alan Luong
(74) *Attorney, Agent, or Firm* — Jackson Walker L.L.P.

(57) ABSTRACT

A control server receives a local input to control a remote video device and sends an indication of the local input to the remote video device to control, access, or operate the remote video device. Video data indicative of images provided by the remote video device in response to the local input are relayed to the control server by the remote video device or associated components. A plurality of remote video devices can be simultaneously controlled, accessed, or operated. Control code sets for remote video devices are mapped to a local interface control set. Local input is translated to a remote video device command based on such mappings.

19 Claims, 6 Drawing Sheets

ACCESSING REMOTE VIDEO DEVICES

BACKGROUND

1. Field of the Disclosure

The present disclosure relates to accessing and controlling remote video devices.

2. Description of the Related Art

Multimedia content may be distributed by a multimedia content distribution network (MCDN) that includes Internet protocol television (IPTV) networks. Video devices such as set-top boxes (STBs) receive the multimedia content from the MCDN. For a person to operate the video device and determine the content of what is displayed by the video device, the person typically must be in the presence of the video device.

DESCRIPTION OF THE EXEMPLARY EMBODIMENTS

Figure 1:
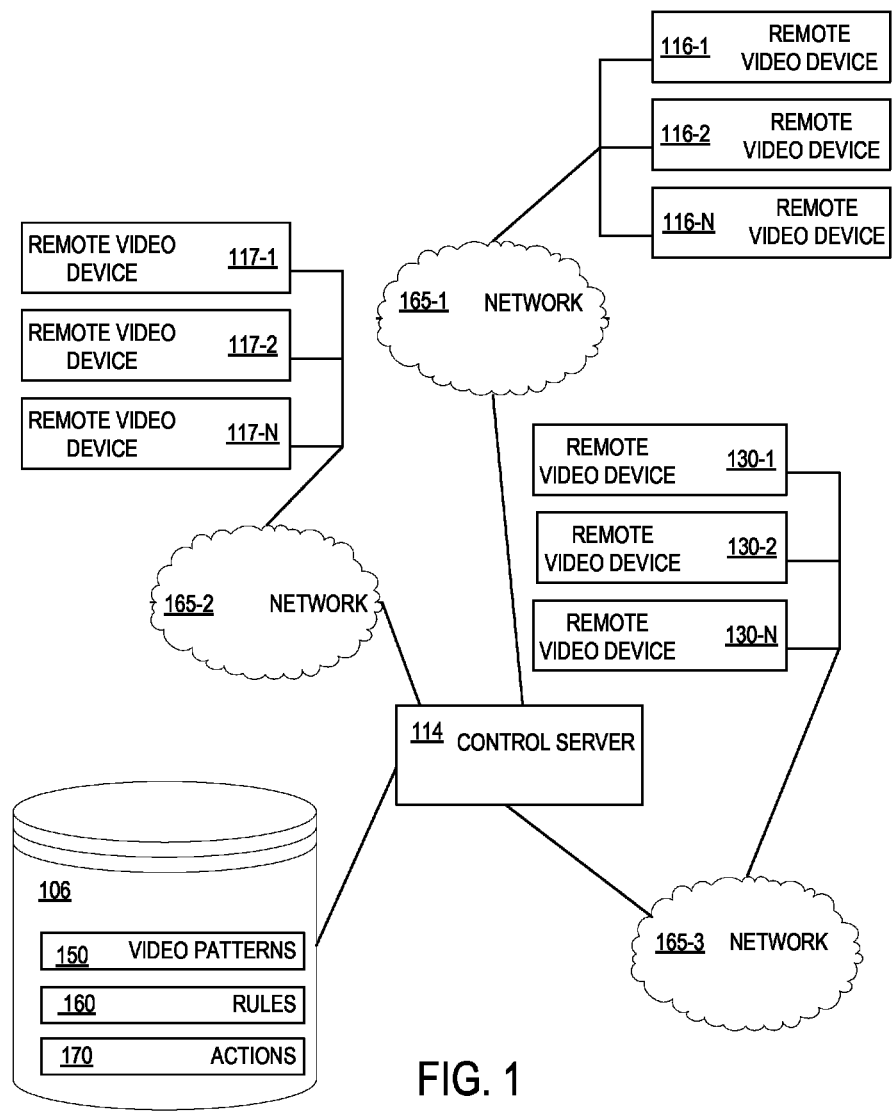
FIG. 1 depicts a system for accessing remote video devices.

In a particular embodiment, a computer method of controlling a remote video device includes receiving first video data from the remote video device, receiving a local input to control the remote video device, sending an indication of the local input to the remote video device, and receiving second video data indicative of video images provided by the remote device in response to the local input. The video data received from the remote video device includes or is indicative of first video images provided by the remote video device. The computer method may further include displaying a local video image based on the second video data, which may provide an administrator the ability to view what is presented by the remote video device in response to the locally provided input.

The computer method, in some embodiments, includes storing the first video data and the second video data. First video images based on the first video data and second video images based on the second video data, in some embodiments, are compared to predetermine video patterns. In response to a trigger event (e.g., second video images corresponding to a predetermined video pattern), disclosed embodiments may take one or more recovery actions. For example, if the comparing steps indicate that the first or second video images presented by the remote video device include an error screen, the recovery action (e.g., updating a crash log) may be performed.

Local input provided to control the remote video device can be provided by a software routine and can be executed periodically or in response to administrator input. For example, a series of local user inputs may be assembled for execution as a batch file. The batch file may be scheduled for periodic (e.g., hourly, daily, etc.) execution. The computer method may further include mapping a control code set to a local interface control set. The control code set is associated with the remote video device or associated with a plurality of remote video devices. In response to an administrator providing local input, the input can then be translated using the control code set to control information used by the remote video device. The computer method may include remotely controlling and monitoring the remote video device through an MCDN, which may include one or more IPTV networks.

In another aspect, a remote video device controller includes a processor, a remote video adapter, and a storage that includes computer instructions for remotely controlling, monitoring, and accessing remote video devices. Instructions enable the remote video device controller to receive a local input to control a remote video device. The local input emulates an infrared (IR) input. Further instructions convert the local input to a remote video device command, send an indication of the remote video device command to the remote video device, and detect a change in content or image displayed by the remote video device after said sending. The remote video device command may bring the remote video device to a predetermined state, for example by rebooting the remote video device command, providing certain instructions to a user, and the like.

Embodied remote video device controllers may compare a video image or video images received from the remote video device to stored video patterns to detect a video pattern event. The video pattern event may indicate an absence of normal operation by the remote video device. For example, a video pattern event may indicate that an error screen has been presented or is currently being presented by the remote video device. In some embodiments, the remote video device controller adapts stored video patterns during operation based on the video image or images received from the remote video device.

Another embodiment relates to a service for controlling a remote video device. The service includes receiving first video data from the remote video device, sending an indication of a local control command to the remote video device, and receiving second video data indicative of a second video image produced by the remote video device responsive to the local control command. The first video data received from the remote device is indicative of first video images processed by the remote video device. In some embodiments, the service includes mapping a control code set to a local interface control set. The local interface control set is for the remote video device and a local interface control set includes the local control command. The service further includes translating the local control command to a remote video device command based on the mapping.

Disclosed embodiments relate to remotely monitoring, controlling, and testing of Internet protocol (IP) based video assets. Monitoring, controlling, and testing of the video assets can be performed from one centralized location and include: (1) acquiring and managing different video streams from various IP-based video devices connected within an IP-based network; (2) combining and storing video streams for consumption and further video analysis as specified by an administrator; (3) controlling the IP-based devices via user defined commands that map to the features of the given device(s); (4) mapping and creating such commands through a learning process; (5) storing code mappings in databases for future use; (6) assigning the appropriate command-codes database when a given IP-based video asset is selected to control the asset; and (7) enabling administrators to capture, store, display, and edit commands sent to the IP-based video device in a scripted format for future replay and automation.

Using disclosed embodiments, administrators can control and test any remote video assets and devices. Example remote video assets and devices include without limitation video-based applications, simulation tools, STBs, mobile phones, and personal digital assistants (PDAs). Control and testing of the remote video assets and devices can be performed over different IP-based networks including without limitation local area networks (LANs), wide area networks (WANs), 3G networks, and 4G networks. These networks can operate over any transport media including but not limited to copper, fiber, fixed-wireless, cellular, coaxial cable, and power line. Using disclosed embodiments, traditional direct local connections through wires may be unnecessary between the controller (i.e., the testing equipment) and the device (i.e., the remote video asset or device) because control and testing over IP-based networks is possible.

In some testing or operational environments, an administrator or user wishes to control multiple IP-based video assets (e.g., STBs) remotely. In some cases, using an IR remote control, an administrator must be within line-of-sight of an STB and must provide manual input to affect the operation of each STB. This can require that the administrator be physically in front of the STB and the display monitor to verify the actions taken by the STB in response to the IR command sent. Controlling multiple STBs, for example for testing purposes, using such systems can be labor intensive. Furthermore, such manual methods of controlling STBs do not capture and store commands so that the commands can be repeatedly sent later to test or achieve the same scenario on other STBs. Disclosed embodiments permit automatic monitoring, controlling, and testing of STBs that are not physically accessible (due to distance or location) to an administrator.

Using network control, monitoring, and testing of remote video assets helps prevent limitations on the physical distances between controller(s) and video assets. Disclosed embodiments permit rapid and repeatable set up and configuration between controller(s) and video assets. This can promote lower costs for control, testing, troubleshooting, maintenance, and repair of both controllers and video assets. Individual consumers may employ disclosed embodiments, or disclosed embodiments may be used by entities such as international companies, telecommunications carriers, mobile telephone operators, cable operators, fixed wireless operators, government-sponsored and/or owned entities, power companies, and the like.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 illustrates a system for controlling and monitoring a remote video device in accordance with disclosed embodiments. As shown, remote video devices 116 are communicatively coupled to control server 114 through network 165-1. Likewise, remote video devices 117 are communicatively coupled to control server 114 through network 165-2. Remote video devices 130 are communicatively coupled to control server 114 through network 165-3. As shown, control server 114 remotely monitors and controls remote video devices 116, 117, and 130 through a plurality of networks. The networks may be part of an MCDN and may provide IPTV content to the remote video devices.

As shown, control server 114 can access database 106 which includes video patterns 150, rules 160, and actions 170. In some embodiments, control server 114 monitors video images of a remote video device (e.g., remote video device 130-1) and compares video images received from the remote video device to video patterns 150. Rules 160 may be accessed by control server 114 to determine when a trigger event has occurred. For example, a video patterns 150 may include an error screen, and control server 114 may receive video data that indicates that remote video device 130-1 has presented a corresponding error screen. Rules 160 may include a rule that if an error screen presented by remote video device 130-1 corresponds to an error screen in video patterns 150, a certain action (e.g., a reboot) is taken. For example, an administrator may be notified, the remote video device 130-1 may be brought to a predetermined state, or other such recovery actions may be taken. Rules 160 and actions 170 may be updated by an administrator. Likewise, video patterns 150 may be adapted during operation to include video patterns used for monitoring one or more remote video devices.

In some disclosed embodiments, control server 114 accesses video images presented by remote video device 116-1. Remote video device 116-1 may transmit and stream video data through network 165-1 to control server 114. Control server 114 may provide control command through network 165-1 to remote video device 116-1. An administrator accessing control server 114 may provide user input that simulates or causes IR input to be received by remote video device 116-1. In some embodiments, a control code set for a video device 116-1 is mapped to controls presented through a user interface presented by control server 114 to an administrator. An administrator may provide input to the interface to control remote video device 116-1, and control server 114 translates the inputs using the control code set to control signals used by remote video device 160-1. Remote video device 116-2 may be controlled in a similar way, and may operate using a different control code set as compared to remote video device 116-1. Similarly, control server 114 may control remote video device 117-1 using a control code set compatible with remote video device 117-1. In this way, an administrator may simultaneously operate a single interface provided by control server 114 to simultaneously operate, monitor, access, and control multiple remote video devices in multiple locations that have different control parameters. Once the remote video devices receive and act on the user input, the administrator may receive over one or more networks video data that indicates video images presented by the remote video devices in response to the user input. Video data received by control server 114 may be stored by control server 114 and analyzed at any time.

Figure 2:
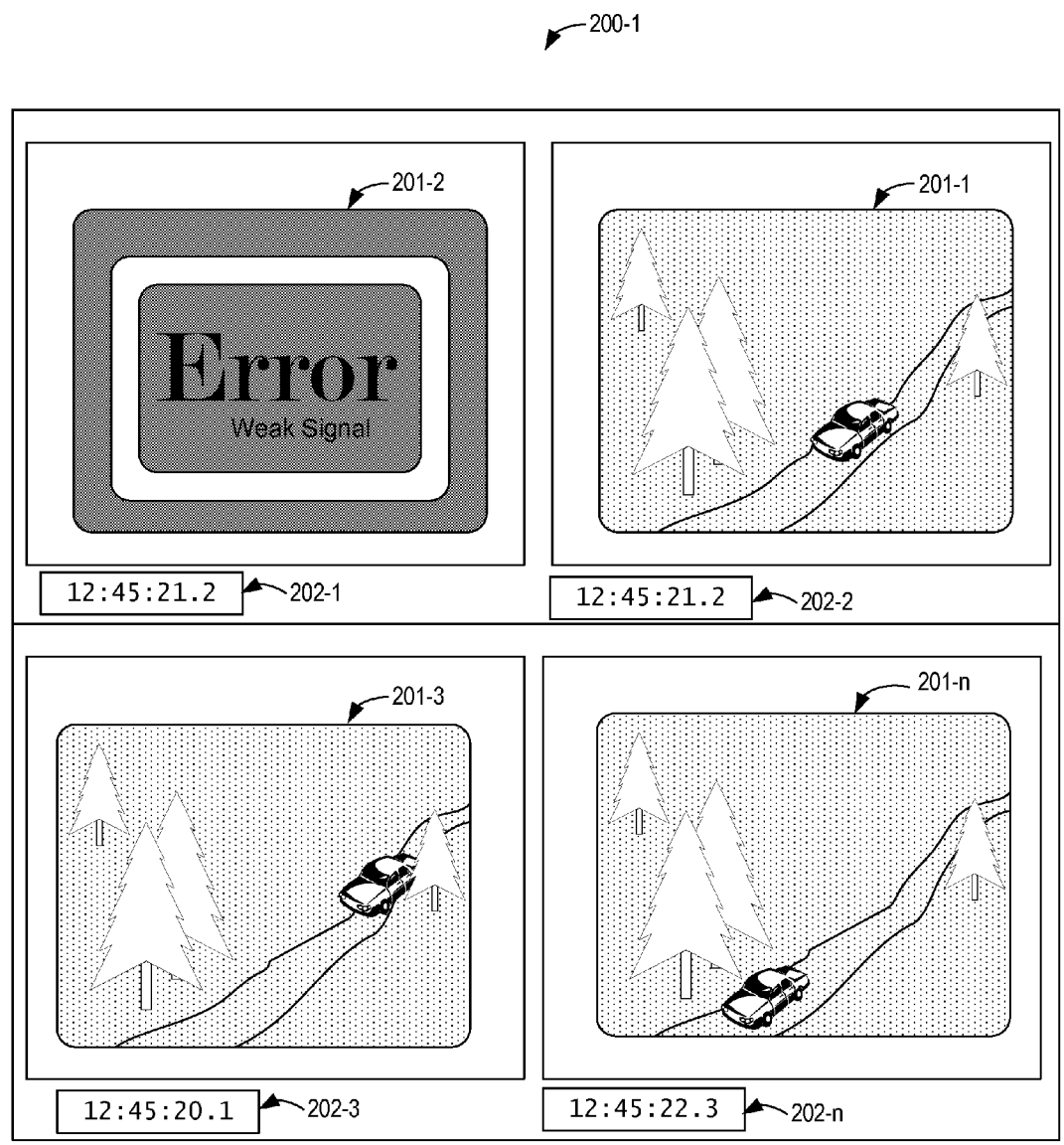
FIG. 2 depicts an interface for viewing the multimedia content displayed by multiple remote video devices.

FIG. 2 illustrates a display interface 200-1 that may be viewed by an administrator or user during operation of the disclosed embodiments. Display 201-2 may be populated with video images received from a remote video device (e.g., remote video device 116-1). Similarly, displays 201-1, 201-3, and 201-n are populated with video images received from remote video devices. As shown, each display 201 includes a timer 202 that indicates a universal time at which the remote video devices display the viewed video images. Displays 201-1, 201-3, and 201-n all display an automobile traveling down a road. As shown, the automobile is shown in different locations, possibly due to delays in a control server (e.g., control server 114 in FIG. 1) receiving and processing video data received from the corresponding remote video devices. In some embodiments, a user (e.g., an administrator) provides input to a local user interface to result in remote video commands being sent to four separate remote video devices corresponding to displays 201. The control server then receives video data representing video images presented by the remote video devices in response to the control commands. As shown, the remote video device corresponding to display 201-2 has an error related to a weak signal. However, the remote video devices corresponding to displays 201-1, 201-3, and 201-*n* appear to be operating normally, because content (i.e., a multimedia program showing an automobile) requested to be displayed at the remote video devices by the user is streamed from the remote video devices back to the control server and displayed as shown.

Figure 3:
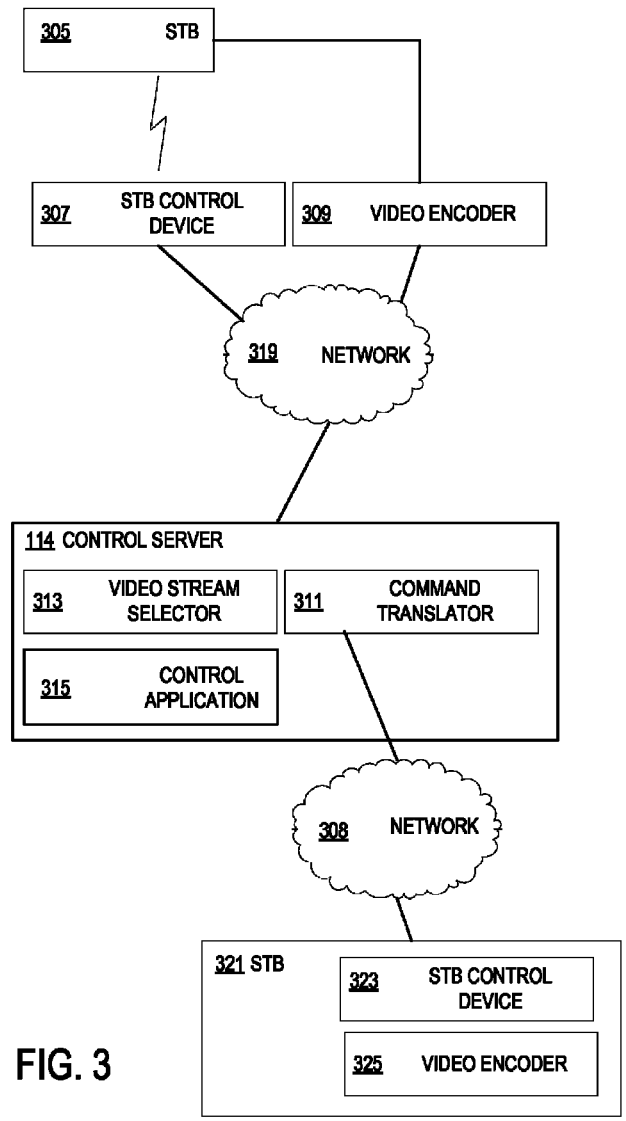
FIG. 3 depicts further details of a system for accessing remote video devices.

FIG. 3 illustrates additional details for control server 114 including video stream selector 313, command translator 311, and control application 315. As shown in FIG. 3, control server 114 may be similar to or identical to control server 114 in FIG. 1. Video stream selector 313 enables a user (e.g., an administrator), to select for viewing or analysis, video data received from a portion of remote video devices available for monitoring, control, or access. Control application 315 presents a user interface to a user of control server 114. For example, control application 315 may present a graphical user interface that includes icons representing buttons that are typically included with a remote control device for controlling an STB or television that includes an STB functionality. For example, control application 315 may present a graphical user interface with a play button, pause button, stop button, record button, menu button, guide button, channel up button, channel down button, volume up button, volume down button, and numerical buttons for manually entering channel numbers. Responsive to receiving user input to the graphical user interface, control application 315 communicates with command translator 311 to translate user commands to control commands (i.e., remote video device commands) that operate remote video devices according to the user input. Command translator 311 may access a control code set that is unique to each remote video device that the user requests to control.

As shown, control server 114 may control STB 305 and STB 321 through networks 319 and 308, respectively. To control STB 305, control server 114 sends signals indicative of a remote video device command through network 319 to STB control device 307. As shown, STB control device 307 is communicatively coupled to STB 305. In some embodiments, STB control device 307 translates commands received from control server 114 to IR commands to affect the video images displayed by STB 305. For example, STB control device 307 may request a channel change to be performed by STB 305. To provide feedback to control server 114 so that control server 114 may determine the effect of control commands it sends, video encoder 309 encodes and streams video data through network 319 to control server 114. The video data represents video images presented by STB 305 in response to the control command sent from control server 114.

As shown, STB 321 is communicatively coupled through network 308 to control server 114. STB 321 includes STB control device 323 and video encoder 325. As shown in FIG. 3, STB control device 323 and video encoder 325 are internal to or integrated into STB 321.

Control server 114, in some embodiments, is a remote video device (e.g., video application, STB, television, etc.) controller that includes a processor (not depicted), a remote video adapter (not depicted), and a storage (not depicted). The storage may have embedded instructions that enable control server 114 to receive a local input to control a remote video device (e.g., STB 305). The local input may emulate an IR input. For example, control application 315 may present a graphical user interface to an administrator with a virtual remote control device (i.e., a graphical image of a remote control device with selectable icons representing buttons typically contained on a hand-held remote control device with tactile buttons). Accordingly, the administrator may provide input through the graphical user interface to the virtual remote control device to cause STB control device 307 to provide control commands to STB 305. The local input may be converted to a remote video device command compatible with STB control device 307 and STB 305. An indication of the remote video device command may be sent through network 319 to the remote video device (e.g., STB 305). A change in the content or images displayed by STB 305 can be detected, and images or data associated with the change in content or images is encoded using video encoder 309. As shown, the encoded data is sent from video encoder 309, through network 319, to control server 114. This provides feedback regarding the effects of the remote video device commands sent over network 319. In other words, an administrator is provided an indication of the effects of remote video device commands sent to one or more remote video devices. Accordingly, the administrator can troubleshoot, monitor, and access operation of the remote video devices from a single location.

Figure 4:
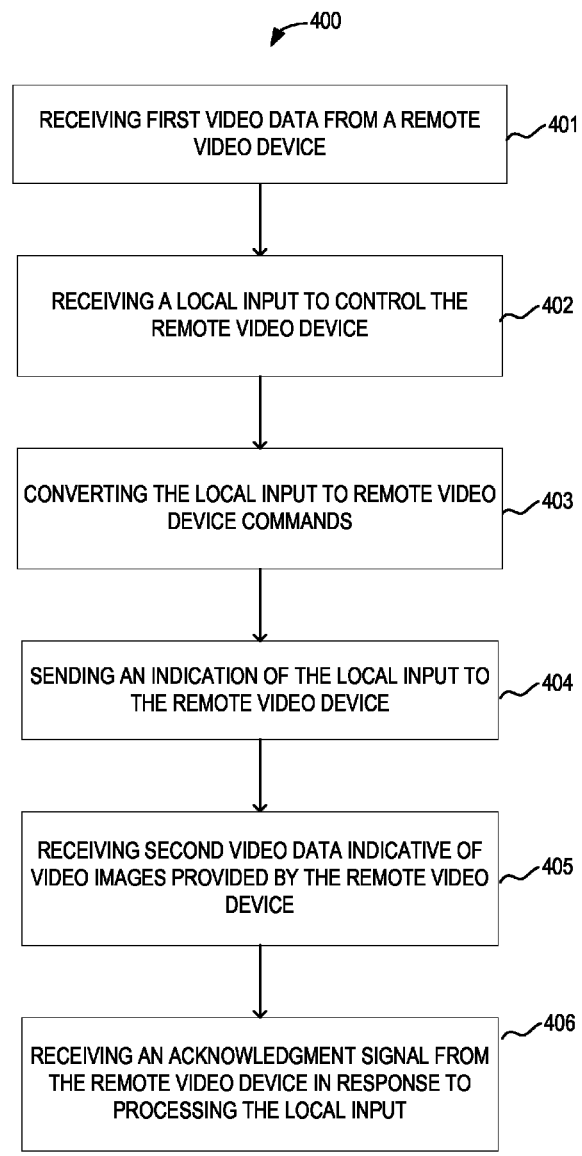
FIG. 4 depicts selected elements of methods, systems, or services for accessing remote video devices.

FIG. 4 illustrates aspects of a computer method 400 for controlling a remote video device. The computer method includes receiving (block 401) first video data from a remote video device. A local input to control the remote video device is received (block 402). The local input may be converted (block 403) to remote video device commands using a control code set that may be specific to the remote video device. An indication of the local input is sent (block 404) to the remote video device. After the remote video device processes the user input, video data indicative of video images provided by the remote video device is received (block 405). In addition to receiving video data indicative of responsive video images, an acknowledgment signal may be received (block 406) that confirms that the remote video device processed the local input command.

Figure 5:
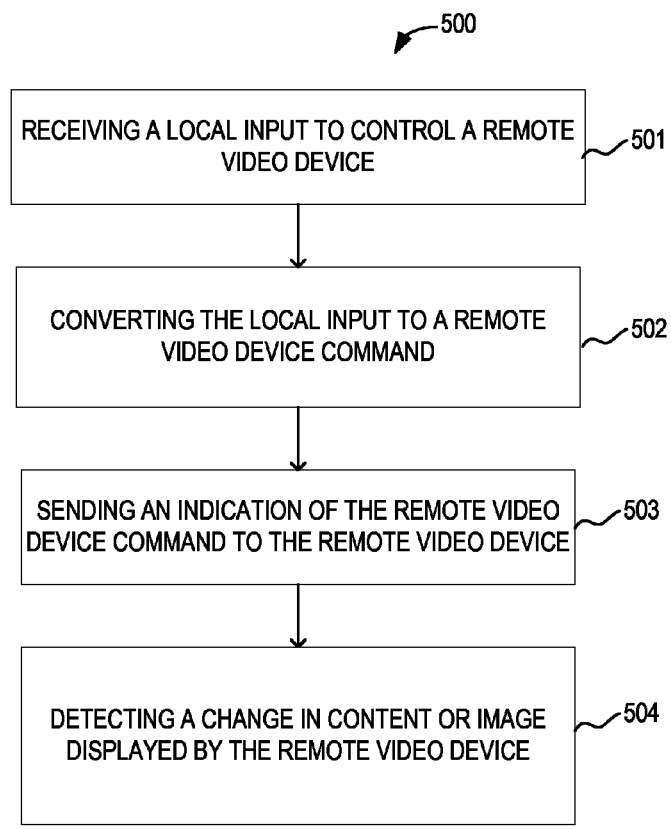
FIG. 5 depicts selected elements of further methods, systems, or services for accessing remote video devices.

FIG. 5 illustrates selected aspects of a computer method 500 for controlling remote video devices. As shown, the remote video device controller includes computer instructions for receiving (block 501) a local input to control a remote video device. Further instructions are for converting (block 502) the local input to a remote video device command. An indication of the remote video device command is sent (block 503) to the remote video device. A change in content or images displayed by the remote video device is detected (block 504). Methods 400 and 500 may individually and collectively be performed by control server 114.

Figure 6:
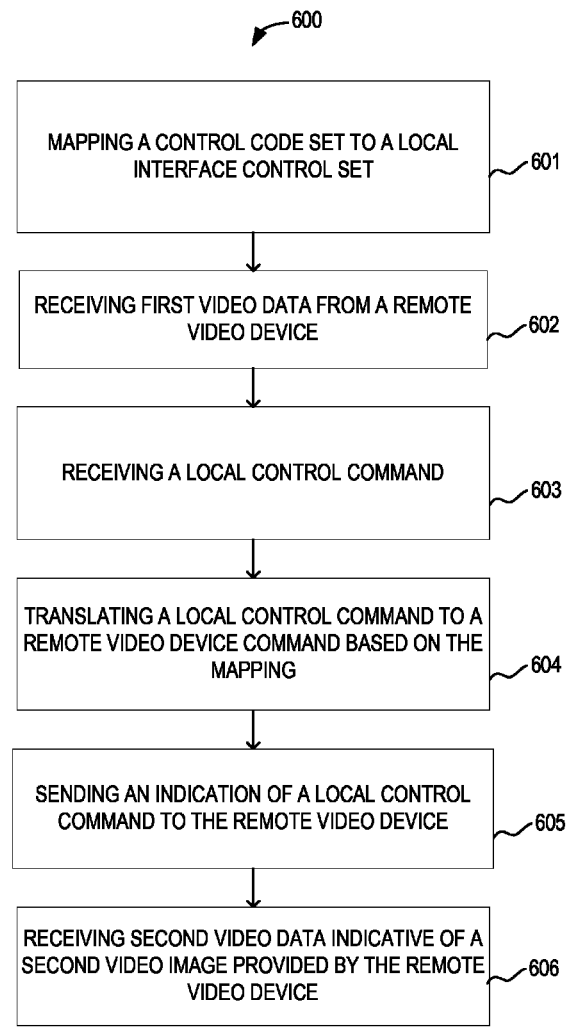
FIG. 6 depicts selected elements of still further methods, systems, or services for accessing remote video devices.

FIG. 6 depicts elements of a disclosed service 600 for controlling a remote video device. As shown, the service includes mapping (block 601) a control code set to a local interface control set. The control code set may be specific to a remote video device controlled by a control server in accordance with disclosed embodiments. Video data is received (block 602) from a remote video device. The video data is indicative of video images remotely presented by the remote video device. A local control command is received (block 603). The local control command is provided to a local interface corresponding to the local interface control set. The local control command may include or represent a request to control, monitor, or access the remote video device. The local control command is translated (block 604) to a remote video device command based on the mapping of the control code set to the local interface control set. An indication of the local control command is sent (block 605) to the remote video device. Second video data indicative of a second video image provided by the remote video device is received (block 606).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A computer method of controlling a remote video device, the method comprising:
receiving, by a control server, first video data from the remote video device, wherein the first video data is indicative of first video images displayed at the remote video device in response to user input to the remote video device;
receiving, by the control server, a local input to control the remote video device;
sending an indication of the local input to the remote video device; and
receiving second video data indicative of second video images provided by the remote video device, wherein the second video images are provided by the remote video device in response to the indication of the local input, and
assembling a series of the local inputs for execution as a batch file.

2. The computer method of claim 1, further comprising:
displaying a local video image based on the second video data.

3. The computer method of claim 1, further comprising:
storing the first video data; and
storing the second video data.

4. The computer method of claim 1, wherein the local input is provided by a software routine.

5. The computer method of claim 1, further comprising:
scheduling the batch file for periodic execution.

6. The computer method of claim 1, further comprising:
mapping a control code set to a local interface control set, wherein the control code set is associated with the remote video device.

7. The computer method of claim 6, further comprising:
translating the local input to a remote video device command, wherein said translating is according to the control code set.

8. The computer method of claim 1, further comprising:
comparing the first video images to a predetermined video pattern; and
responsive to the first video images matching the predetermined video pattern, initiating a recovery action associated with the predetermined video pattern.

9. The computer method of claim 8 wherein the predetermined video pattern represents an error screen.

10. The computer method of claim 9, wherein the recovery action includes obtaining a crash log related to the error screen.

11. The computer method of claim 1, wherein said receiving is via a multimedia content distribution network.

12. The computer method of claim 11, wherein the multimedia content distribution network comprises an Internet protocol television network.

13. A control server, comprising:
a processor;
a computer readable storage medium including computer executable instructions, that, when executed by processor, cause the processor to perform operations comprising:
receiving first video data from the remote video device, wherein the first video data is indicative of first video images displayed at the remote video device in response to user input to the remote video device;
receiving a local input to control the remote video device;
sending an indication of the local input to the remote video device;
receiving second video data indicative of second video images provided by the remote video device, wherein the second video images are provided by the remote video device in response to the indication of the local input; and
assembling a series of the local inputs for execution as a batch file.

14. The control server of claim 13, the operations include:
comparing a video image received from the remote video device to stored video patterns to detect a video pattern event, wherein the video pattern event indicates an absence of a normal operation of the remote video device.

15. The control server of claim 14, the operations include:
adapting the stored video patterns during operation based on the received video image.

16. The control server of claim 15, wherein the remote video device command is for bringing the remote video device to a predetermined state.

17. A non-transitory computer readable medium including processor executable instructions that, method for controlling a remote video device, the computer method comprising when executed by the processor, cause the processor to perform operations comprising:
receiving first video data from the remote video device, wherein the first video data is indicative of first video images displayed at the remote video device in response to user input to the remote video device;
receiving a local input to control the remote video device;
sending an indication of the local input to the remote video device;
receiving second video data indicative of second video images provided by the remote video device wherein the second video images are provided by the remote video device in response to the indication of the local input; and
assembling a series of the local inputs for execution as a batch file.

18. The non-transitory computer readable medium of claim 17,
wherein the operations include:
mapping a control code set to a local interface control set, wherein the control code set is for the remote video device, wherein the local interface control set includes the local control command; and
translating the local control command to a remote video device command based on said mapping.

19. The control server of claim 15, wherein the operations include:
receiving, by the control server, at least a portion the multimedia content displayed by the remote video device.

* * * * *

UNITED STATES PATENT AND TRADEMARK OFFICE
CERTIFICATE OF CORRECTION

PATENT NO. : 8,661,487 B2
APPLICATION NO. : 12/577612
DATED : February 25, 2014
INVENTOR(S) : Hung John Pham and Bach N. Hoang It is certified that error appears in the above-identified patent and that said Letters Patent is hereby corrected as shown below:

In the Claims
   Column 8, lines 31-62, claim 17 through 19 should read as follows:

17. The control server of claim 15, wherein the operations include:
   receiving, by the control server, at least a portion the multimedia content displayed by the remote video device.

18. A non-transitory computer readable medium including processor executable instructions that, ~~method for controlling a remote video device, the computer method comprising~~ when executed by the processor, cause the processor to perform operations comprising:
   receiving first video data from the remote video device, wherein the first video data is indicative of first video images displayed at the remote video device in response to user input to the remote video device;
   receiving a local input to control the remote video device;
   sending an indication of the local input to the remote video device;
   receiving second video data indicative of second video images provided by the remote video device, wherein the second video images are provided by the remote video device in response to the indication of the local input; and
   assembling a series of local user inputs for execution as a batch file.

19. The non-transitory computer readable medium of claim 18, wherein the operations include:

Signed and Sealed this
Twenty-second Day of July, 2014

Michelle K. Lee
*Deputy Director of the United States Patent and Trademark Office* mapping a control code set to a local interface control set, wherein the control code set is for the remote video device, wherein the local interface control set includes the local control command; and translating the local control command to a remote video device command based on said mapping.